US012806879B2

(12) United States Patent
Totani

(10) Patent No.: US 12,806,879 B2
(45) Date of Patent: Nov. 24, 2026

(54) CROSS CUT DEVICE, BAG MAKING APPARATUS, AND CROSS CUT METHOD

(71) Applicant: Totani Corporation, Kyoto (JP)

(72) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 9 days.

(21) Appl. No.: 18/862,952

(22) PCT Filed: Mar. 15, 2023

(86) PCT No.: PCT/JP2023/010123
§ 371 (c)(1),
(2) Date: Nov. 5, 2024

(87) PCT Pub. No.: WO2023/218754
PCT Pub. Date: Nov. 16, 2023

(65) Prior Publication Data

US 2025/0289201 A1 Sep. 18, 2025

(30) Foreign Application Priority Data

May 10, 2022 (JP) ................................ 2022-077431

(51) Int. Cl.
*B31B 70/16* (2017.01)
*B31B 70/64* (2017.01)
*B31B 155/00* (2017.01)

(52) U.S. Cl.
CPC .............. *B31B 70/16* (2017.08); *B31B 70/64* (2017.08); *B31B 2155/00* (2017.08)

(58) Field of Classification Search
CPC ..... B31B 70/16; B31B 70/64; B31B 2155/00; B31B 1/00; G01N 21/84; G01N 21/55;
(Continued)

(56) References Cited

U.S. PATENT DOCUMENTS 5,695,106 A * 12/1997 Bauknecht .............. B31B 70/00 226/32
6,088,994 A * 7/2000 Nakagawa .......... B29C 66/4312 53/374.6

(Continued)

FOREIGN PATENT DOCUMENTS

WO WO-2009131226 A1 * 10/2009 ............. B29C 55/06
WO 2019123875 6/2019
WO 2019163496 8/2019

*Primary Examiner* — Sameh Tawfik
(74) *Attorney, Agent, or Firm* — JCIPRNET

(57) ABSTRACT

A cross cut device shears a web twice during a pause phase of an intermittent feed cycle. The cross cut device includes a cutter pair including an upper blade and a lower blade, a vertical movement device for reciprocating the upper blade with respect to the lower blade to shear the web, and a horizontal movement device for horizontally moving the cutter pair between a first position and a second position spaced upstream of the first position. During the reciprocation of the upper blade for the second shearing, the horizontal movement device starts to move the cutter pair from the second position to the first position after the upper blade reaches a lowermost height and before the upper blade exceeds a shear height. The feed device starts to feed the web after the cutter pair starts to move from the second position to the first position.

9 Claims, 14 Drawing Sheets

(58) Field of Classification Search
CPC .... B65B 1/22; B65B 9/00; B65B 9/06; B65B 57/08
USPC .......................................................... 493/227
See application file for complete search history.

(56) References Cited

U.S. PATENT DOCUMENTS

| | | | | |
|---|---|---|---|---|
| 6,106,448 | A * | 8/2000 | Obara | B31B 50/00 493/227 |
| 6,427,422 | B2 * | 8/2002 | Nakagawa | B65B 51/306 53/437 |
| 6,739,367 | B1 * | 5/2004 | Totani | B29C 66/005 156/583.1 |
| 6,744,515 | B1 * | 6/2004 | Totani | B26D 5/007 356/429 |
| 11,198,269 | B2 * | 12/2021 | Totani | B26D 7/1863 |
| 2008/0250908 | A1 * | 10/2008 | Totani | B26D 5/08 83/76 |
| 2011/0212815 | A1 * | 9/2011 | Totani | B65D 31/10 493/243 |
| 2013/0267399 | A1 * | 10/2013 | Schiebout | B29C 66/433 493/193 |
| 2020/0391471 | A1 * | 12/2020 | Kikuchi | B31B 70/645 |
| 2023/0158755 | A1 * | 5/2023 | Totani | B29C 66/8161 156/583.1 |

* cited by examiner

CROSS CUT DEVICE, BAG MAKING APPARATUS, AND CROSS CUT METHOD

CROSS-REFERENCE TO RELATED APPLICATION

This application is a 371 application of the International PCT application serial no. PCT/JP2023/010123, filed on Mar. 15, 2023, which claims the priority benefits of Japan Patent Application No. 2022-077431, filed on May 10, 2022. The entirety of each of the above-mentioned patent applications is hereby incorporated by reference herein and made a part of this specification.

TECHNICAL FIELD

This application relates to a cross cut device for shearing a web and a bag making apparatus including said cross cut device. This application also relates to a cross cut method for shearing a web used for bag making.

BACKGROUND

A bag making apparatus, for example, includes an intermittent feed device that intermittently feeds a web in the longitudinal direction of the web, a processing device that processes the web during a pause phase of an intermittent feed cycle, and a cross cut device that cuts the processed web in the width direction of the web to shape a bag during a pause phase of an intermittent feed cycle.

For example, the processing device is a heat seal device that heat-seals the web in the width direction and/or longitudinal direction of the web and/or a punching machine that punches the web such that the shaped bag has corner cut parts.

For a bag with a sharp corner, a user might be hurt by the corner. On the other hand, the corner cut part, for example, has a rounded shape, which can prevent hurt. The corner cut part can also improve the appearance of the bag.

The cross cut device is located downstream of the processing device. The cross cut device typically shears the web using a cutter pair including an upper blade and a lower blade.

Cross-cutting may involve single shearing only or twice shearing. For the former case, if the cutting position is misaligned, a protrusion (such as the one illustrated by the reference sign 170*a* in FIG. 13B in Patent Document 1) will be generated at the corner cut part. This may degrade the appearance of the bag, and may also be a cause of hurt.

The latter case can prevent the generation of such a protrusion (see, for example, FIG. 11 in Patent Document 2). Specifically, the latter case shears the web using the cutter pair (the first time), moves the cutter pair upstream, shears the web again using the cutter pair (the second time), and then moves again the cutter pair downstream back to its initial position.

Cross-cutting which involves twice shearing prevents the generation of the protrusions. However, a waste is inevitably generated during the second shearing. If such a waste is not properly separated away from the web, the waste can stick to the shaped bag, which could lead to problems of contaminating a foreign object.

CITATION LIST

Patent Document

Patent Document 1: WO2019/123875A1. Patent Document 2: WO2019/163496A1

SUMMARY

An object of this application is to ensure that a waste generated by cross-cutting which involves twice shearing is separated from a web.

According to the present application, there is provided a cross cut device for use in bag making and for shearing a web twice during a pause phase of an intermittent feed cycle. The cross cut device includes: a cutter pair including an upper blade and a lower blade; a feed device for intermittently feeding a web in a longitudinal direction of the web; a vertical movement device for vertically reciprocating the upper blade with respect to the lower blade to shear the web; and a horizontal movement device for horizontally moving the cutter pair between a first position for first shearing and a second position for second shearing, the second position being spaced upstream of the first position. The horizontal movement device is configured, during the reciprocation of the upper blade for the second shearing, to start to move the cutter pair from the second position to the first position subsequent to the upper blade reaching a lowermost height and prior to the upper blade exceeding a shear height. The feed device is configured to start to feed the web subsequent to the cutter pair starting to move from the second position to the first position.

The feed device may be configured to, during the reciprocation of the upper blade for the second shearing, start to feed the web prior to the upper blade exceeding the shear height and pass the web through a space between the upper blade and the lower blade subsequent to the upper blade exceeding the shear height.

The feed device may be configured to, during the reciprocation of the upper blade for the second shearing, start to feed the web subsequent to the upper blade exceeding the shear height and prior to the upper blade reaching an uppermost height.

According to the present application, there is also provided a bag making apparatus for successively making bags from at least one web, including the cross cut device described above.

The bag making apparatus may further include a punching machine disposed upstream of the cross cut device to punch the web during every intermittent feed cycle. The punching machine may include: a first punching blade for punching a hole or cutout for corner cut parts in the web; and a second punching blade for punching a hole for notches in the web at a position spaced in a width direction of the web away from the hole or cutout for the corner cut parts. The cross cut device may be configured to shear the web, using the cutter pair, in the width direction of the web across the hole or cutout for the corner cut parts and the hole for the notches to shape the bag having the notches and the corner cut parts.

According to the present application, there is also provided a cross cut method for shearing a web using a cutter pair including an upper blade and a lower blade to shape a bag. The method includes: (a) pausing feeding the web; (b) reciprocating the upper blade vertically with respect to the lower blade to shear the web in a width direction of the web at a first position during the step (a); (c) moving the cutter pair from the first position to a second position spaced upstream of the first position, following the step (b) and during the step (a); (d) reciprocating the upper blade again vertically with respect to the lower blade to shear the web in the width direction of the web at the second position, following to the step (c); (e) starting to move the cutter pair from the second position to the first position after the upper blade reaches a lowermost height in the step (d) and before the upper blade exceeds a shear height in the step (d); and (f) starting to feed the web in a longitudinal direction of the web after the step (e).

The step (f) may include: starting to feed the web before the upper blade exceeds the shear height in the step (d); and passing the web through a space between the upper blade and the lower blade after the upper blade exceeds the shear height in the step (d).

The step (f) may include starting to feed the web after the upper blade exceeds the shear height in the step (d) and before the upper blade reaches an uppermost height in the step (d). The web may include a sealant layer.

DETAILED DESCRIPTION

With reference to the accompanying drawings, embodiments according to the present application will now be described below. The following is merely examples of the present application.

Figure 1:
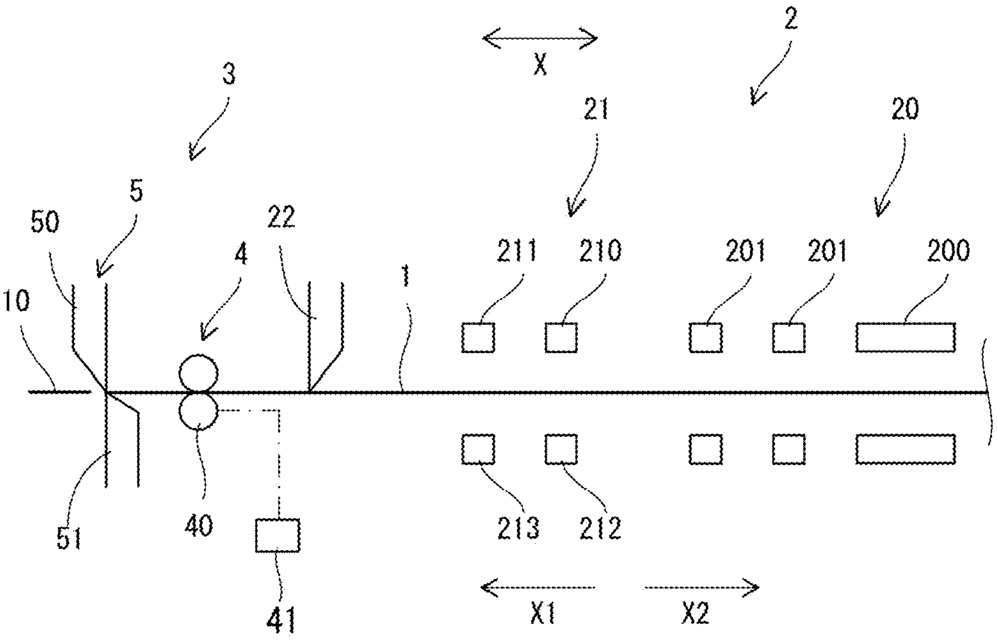
FIG. 1 is a schematic side view of a downstream section of an example bag making apparatus.

FIG. 1 illustrates a downstream section of an example bag making apparatus. A web 1 is unrolled from the original roll (not illustrated) located in the upstream zone of the bag making apparatus. The web 1 is intermittently fed in its longitudinal direction in the downstream zone of the bag making apparatus. Therefore, the web 1 is repeatedly fed and paused. The feed direction is designated by the reference sign X1. In the embodiment, two webs 1 are intermittently fed in a state in which they are superposed on each other. Alternatively, one web 1 in a state of being folded in half may be intermittently fed.

The web(s) 1 is, in the embodiment, a laminated film in which one side surface thereof is constituted by a base and the other side surface thereof is constituted by a sealant. Instead, the web 1 may include a base made of paper and resin applied at least partially to the base. Alternatively, the web 1 may be made of mono-material.

The bag making apparatus includes a cross cut device 3 for shearing the webs 1 in the width direction Y (FIG. 2) of the webs 1 during every intermittent feed cycle to shape bags 10, and a processing device 2 disposed upstream of the cross cut device 3 to process the webs 1 during every intermittent feed cycle. The processing device 2 includes a heat seal device 20, a punching machine 21, and a slitter 22.

Figure 2:
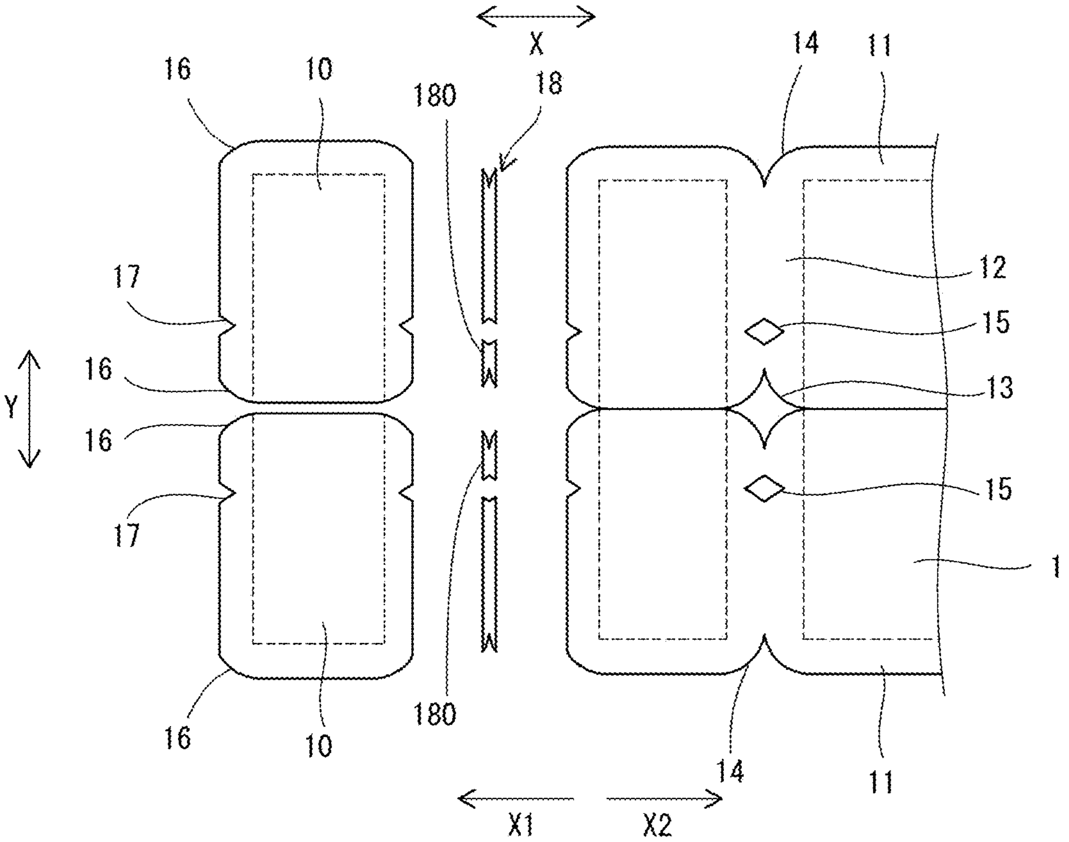
FIG. 2 is a schematic plan view of a processed web and a bag.

The heat seal device 20 heat-seals the webs 1 during every intermittent feed cycle. For example, the heat seal device 20 includes longitudinal heaters 200 that heat-seal the webs 1 in the longitudinal direction X of the webs 1 to form longitudinal sealed sections 11 (FIG. 2) and cross heaters 201 that heat-seal the webs 1 in the width direction Y to form cross sealed sections 12 (FIG. 2). These heaters 200 and 201 include, for example, heat seal bars.

The punching machine 21 punches the webs 1 during every intermittent feed cycle. For example, the punching machine 21 includes at least one punching blade 210 for punching a hole 13 and/or a notch 14 for corner cut parts 16 in the webs 1 as illustrated in FIG. 2, and at least one punching blade 211 for punching a hole 15 for notches 17 in the webs 1 as illustrated in FIG. 2. Receiving blades 212 and 213 are provided for these punching blades 210 and 211, respectively. As illustrated in FIG. 2, each of the holes 15 for the notches 17 is formed in the webs 1 at a distance in the width direction Y of the webs 1 from the hole 13 and notches 14 for the corner cut parts 16. The wastes generated by punching are eliminated by means of suction or other means (not illustrated).

Figure 3A:
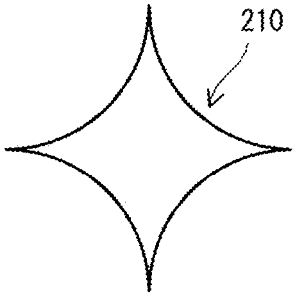
FIG. 3A illustrates a cutting edge of a punching blade for corner cut parts.
Figure 3B:
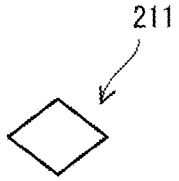
FIG. 3B illustrates a cutting edge of a punching blade for notches.

The cutting edge of the punching blade 210 has a loop shape like with four substantially arc-shaped corner cut parts 16 connected, as illustrated in FIG. 3A. The cutting edge of the punching blade 211 has a substantially rhombic shape like with substantially two notches 17 connected, as illustrated in FIG. 3B.

The slitter 22 is positioned, for example, in the center of the webs 1 in the width direction Y. As the webs 1 are fed, the webs 1 are slit in its longitudinal direction X by the slitter 22.

The cross cut device 3 shears the webs 1 in the width direction Y during every intermittent feed cycle to shape bags 10 from the webs 1. The embodiment provides the so-called two-line bag making. That is, as illustrated in FIG. 2, two bags 10 are shaped every cycle of cross-cutting.

The cross cut device 3 shears the webs 1 twice during a pause phase of an intermittent feed cycle, as described below. As illustrated in FIG. 2, the portions cut-off from the webs 1 at the first shearing become the bags 10. The panel parts of the bag 10 are formed from the webs 1. The portions cut-off from the webs 1 at the second shearing are a waste 18.

The cross cut device 3, for example, shears the webs 1 in the width direction Y across the holes 13 and 15, and the notches 14. In this case, the bag 10 has the corner cut parts 16 and the notches 17. The arc-shaped corner cut parts 16 are located at the four corners of the rectangular bag 10 and serve to prevent hurt. The notches 17 are located on the opposite side edges of the bag 10, which facilitate opening the bag 10. In the embodiments involving corner-cutting and notching processes, the waste 18 includes small wastes 180.

Figure 4A:
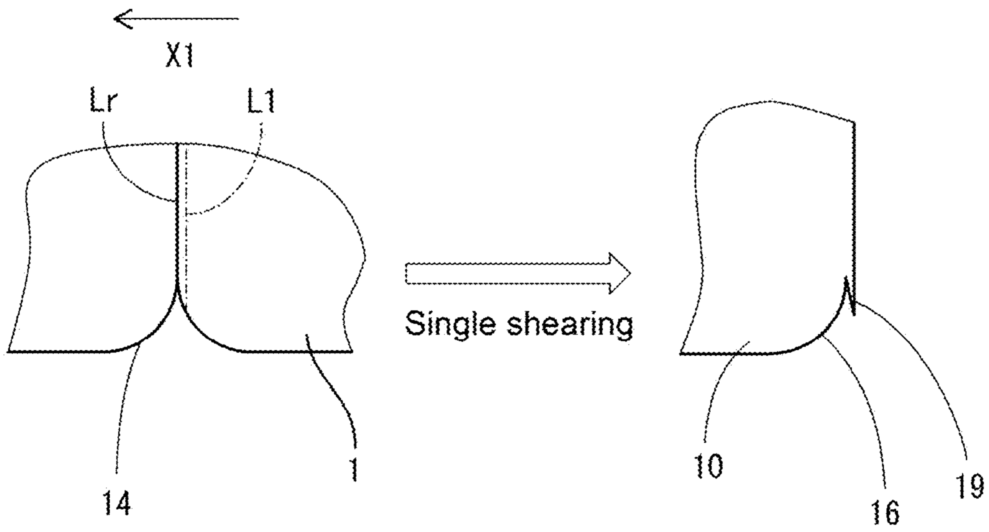
Related Art FIG. 4A
FIG. 4A illustrates cross-cutting which involves single shearing (comparative example) and FIG. 4B illustrates cross-cutting which involves twice shearing.
Figure 4B:
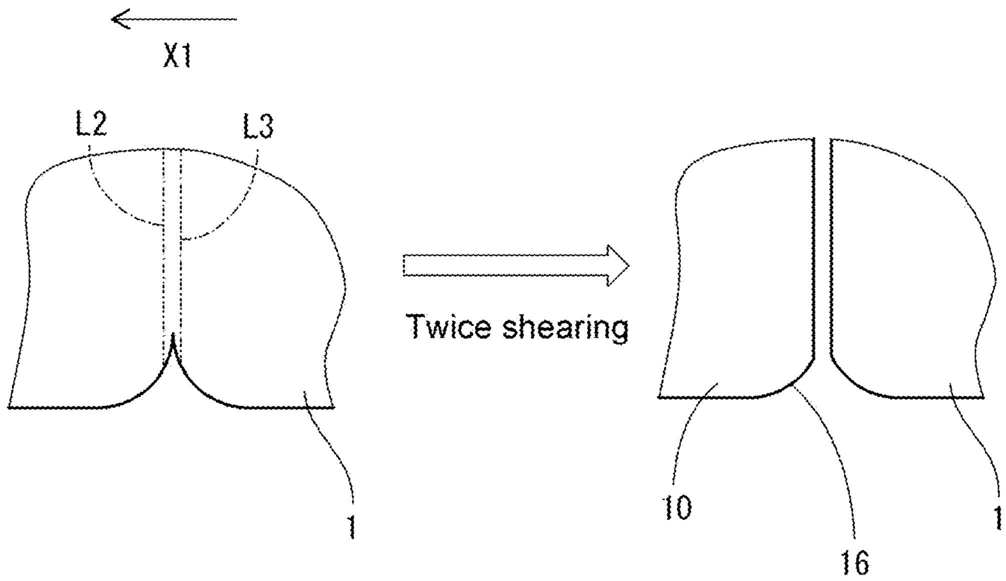

For single shearing in FIG. 4A, if the web(s) 1 is cut on line L1, which deviates from the regular cutting line Lr, a protrusion 19 is generated on the bag 10, which may cause hurt. For twice shearing illustrated in FIG. 4B, if the web 1 is sheared on lines L2 and L3, no protrusions are generated. For this reason, the cross cut device 3 shears the web 1 twice in one cycle of cross-cutting. However, for twice shearing, the generation of a waste 18 is unavoidable.

As illustrated in FIG. 1, the cross cut device 3 includes a feed device 4 for intermittently feeding the webs 1 in the direction X1. The feed device 4 includes two feed rollers 40 and an actuator 41 (e.g., a motor). At least one of the feed rollers 40 is operably connected to the actuator 41. The feed rollers 40 which sandwich the webs 1 therebetween being intermittently rotated by the actuator 41 causes the webs 1 to be intermittently fed.

The cross cut device 3 includes a cutter pair 5 located downstream of the feed rollers 40. The cutter pair 5 includes an upper blade 50 and a lower blade 51 for shearing the webs 1.

Figure 11:
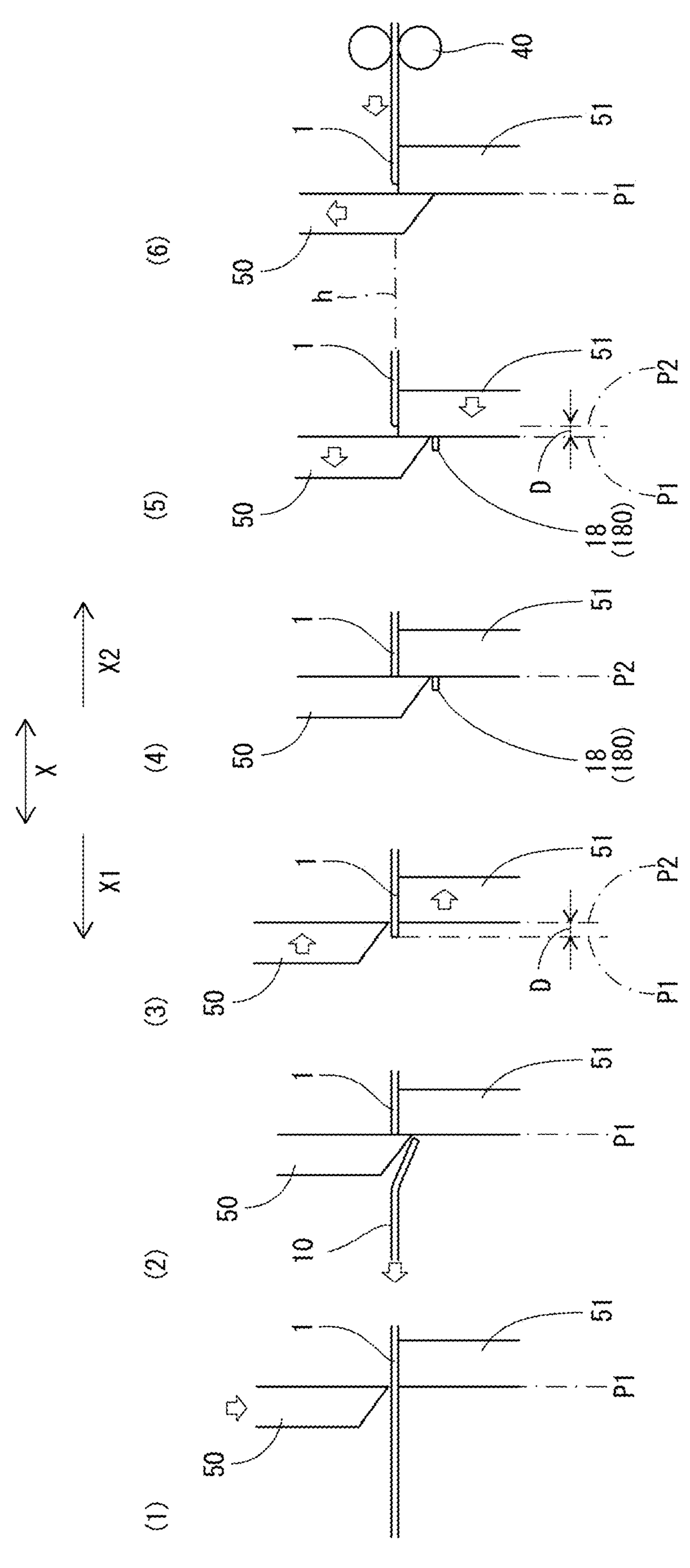
FIG. 11 illustrates an example cross-cutting process using a cross cut device.

The cross cut device 3 includes a vertical movement device 6 (FIG. 5B, FIG. 6B) for moving the upper blade 50 vertically with respect to the lower blade 51 as illustrated in FIG. 11, and a horizontal movement device 7 (FIG. 5B) for moving the cutter pair 5 upstream (in the direction X2) and downstream (in the direction X1).

Figure 5A:
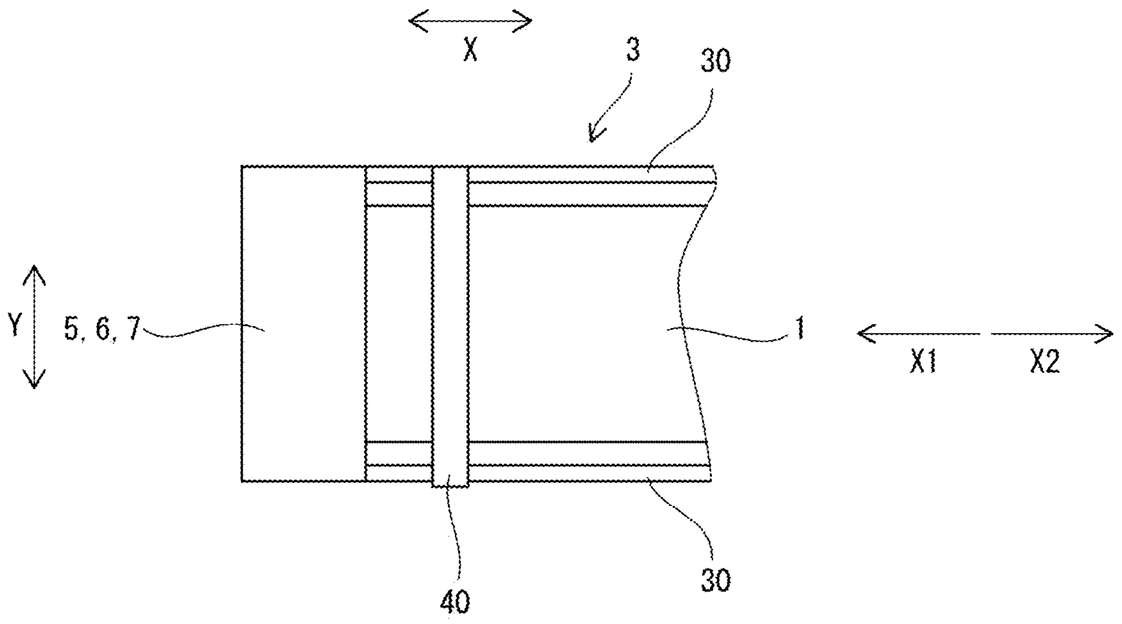
FIG. 5A is a schematic plan view of an example cross cut device.

As schematically illustrated in FIG. 5A, the cutter pair 5, and the devices 6 and 7 are unitized and mounted on main frames 30.

Figure 5B:
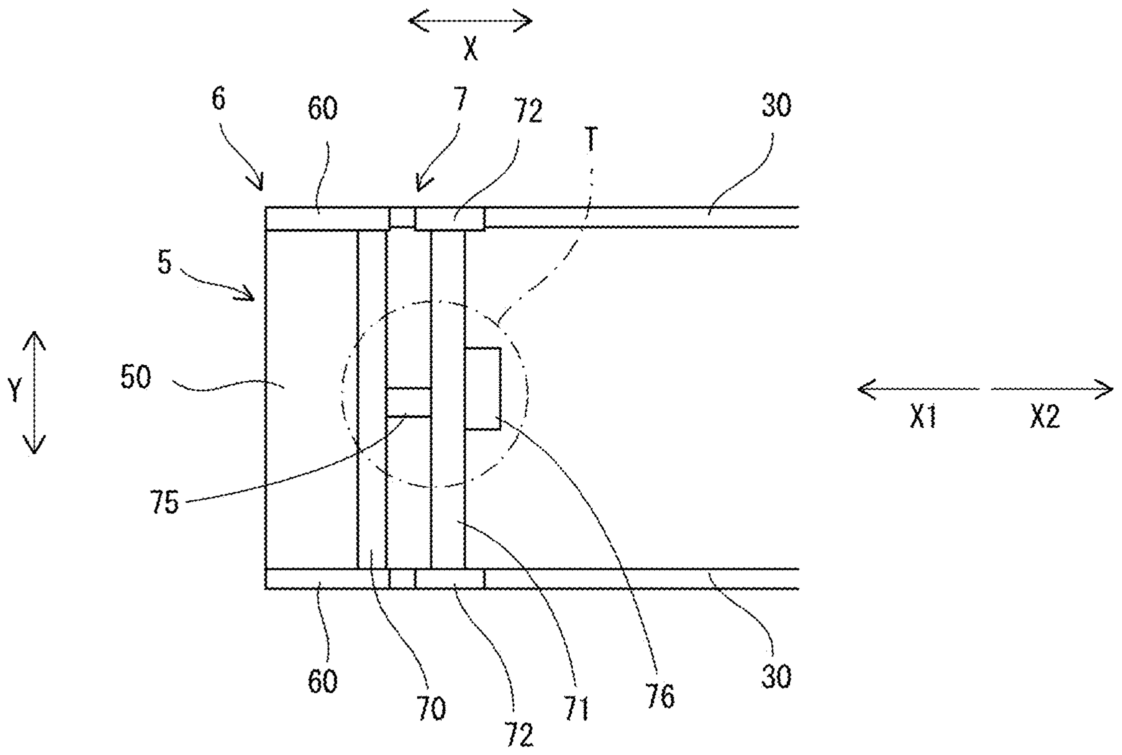
FIG. 5B is a schematic plan view of a vertical movement device and a horizontal movement device.
Figure 6A:
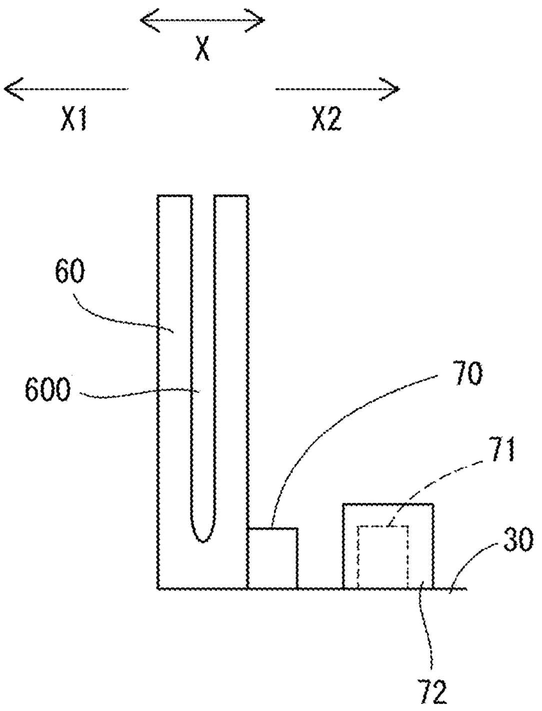
FIG. 6A is a schematic view of a slide guide.
Figure 6B:
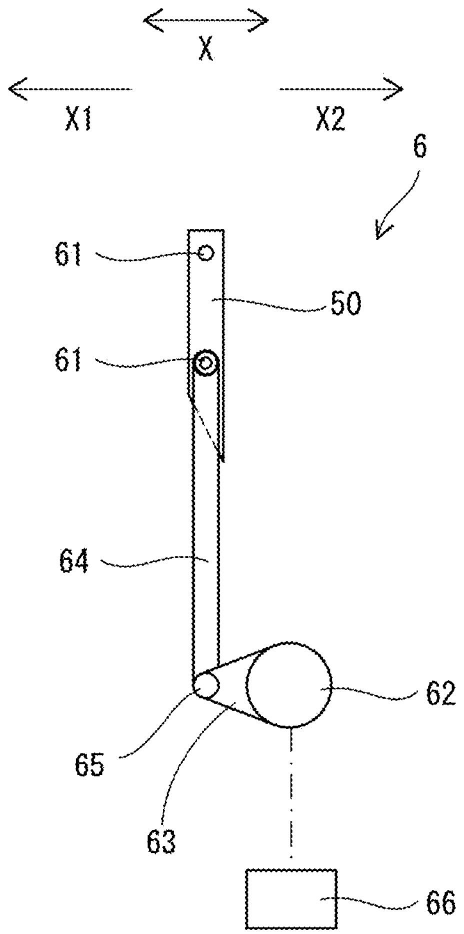
FIG. 6B is a schematic view of a crank mechanism of a vertical movement device.

For example, a crank mechanism may be employed as the vertical movement device 6. As illustrated in FIG. 5B, slide frames 60 are located on the opposite sides of the upper blade 50. As illustrated in FIG. 6A, each of the slide frames 60 has a guide groove 600 extending vertically. As illustrated in FIG. 6B, slide pins 61 are located on the upper and lower parts of the opposite side surfaces of the upper blade 50. The slide pins 61 are received in the guide groove 600, allowing them to slide along the guide groove 600. This allows the upper blade 50 to move vertically along the guide grooves 600. The slide pin 61 is biased upstream (in the direction X2) by a biasing member (not illustrated) such as a spring.

A crankshaft 62 is rotatably supported by the main frames 30. An oval-shaped crank 63 is mounted on the end of the crankshaft 62 to be rotatable together with the crankshaft 62. A connecting rod 64 is connected at its first (lower) end to the tip of the crank 63 via a crank pin 65. The connecting rod 64 is connected at its second (upper) end to the upper blade 50 via the lower slide pin 61. Furthermore, the crankshaft 62 is operatively connected to an actuator 66, such as a motor. Thus, rotating the crankshaft 62 with the actuator 66 causes the upper blade 50 to vertically reciprocate. In this way, the vertical movement device 6 moves the upper blade 50 between the top dead point (uppermost height) and the bottom dead point (lowermost height).

Figure 7A:
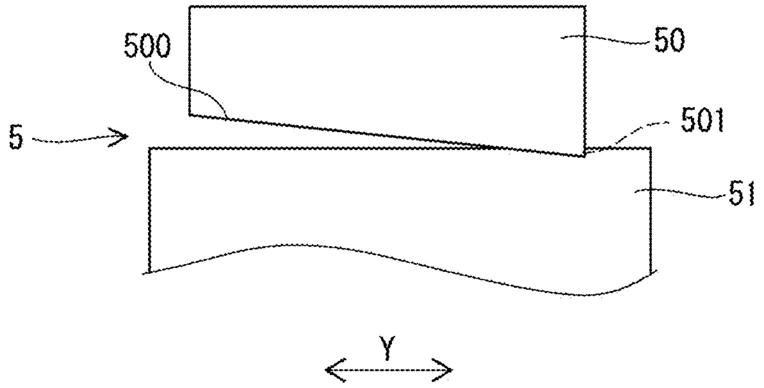
FIG. 7A and FIG. 7B illustrate an example cutter pair, respectively.

FIG. 7A is an arrow view of an example cutter pair 5 when seen from the direction X2, with the upper blade 50 at the top dead point. The straight cutting edge 500 of the upper blade 50 extends obliquely with respect to the vertical direction and the horizontal direction Y. The upper blade 50 has an overlapping section 501 on one side thereof (on the right side in FIG. 7A) that always overlaps the lower blade 51, regardless of its height. In other words, the overlapping section 501 is the surface section that overlaps the lower blade 51 even when the upper blade 50 is at the top dead point. The upper blade 50 is located directly downstream of the lower blade 51 (see FIG. 1) and is biased in the upstream direction X2 by the biasing member, as described above. Therefore, the cutter pair 5 shears (cross-cuts) the web(s) 1 with the upper blade 50 always biased towards the lower blade 51 to be in contact with the lower blade 51. This provides good shearing.

Figure 7B:
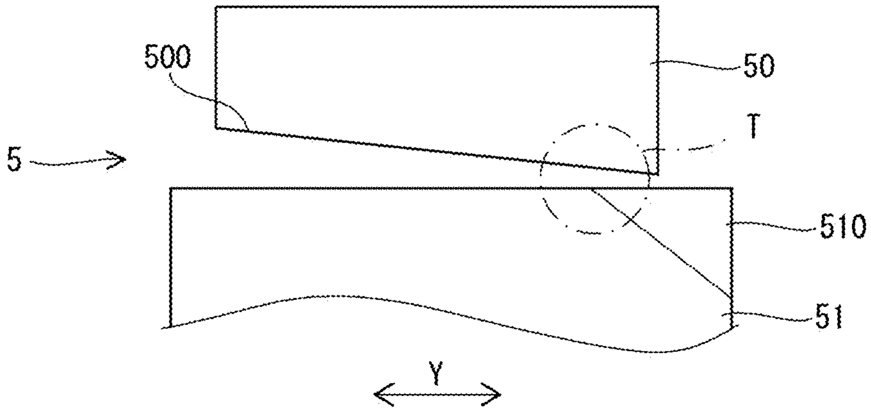
Figure 7C:
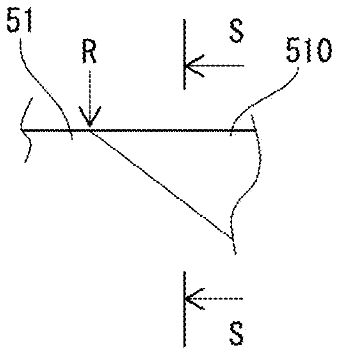
FIG. 7C is an enlarged view of an area T in FIG. 7B.
Figure 7D:
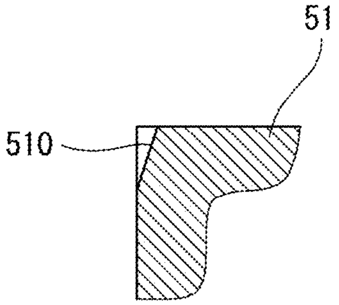
FIG. 7D is a cross-sectional view taken along a S-S line in FIG. 7C.

FIG. 7B illustrates another example cutter pair 5. FIG. 7C is an enlarged view of the region T in FIG. 7B, and FIG. 7D is the cross section taken along the line S-S in FIG. 7C. In this example, when the upper blade 50 is at the top dead point, it does not overlap with the lower blade 51 as illustrated in FIG. 7B. The lower blade 51 has a triangular sloping surface 510 at one corner corresponding to the lowest section of the upper blade 50. When the upper blade 50 moves downward, its blade surface facing upstream rides up on the sloping surface 510, enabling the web(s) 1 to be reliably sheared (cross-cut). In this example, if the web 1 is intermittently fed through a space between the upper blade 50 and the lower blade 51 with an interval from the sloping surface 510 (i.e., not beyond the position R to the right in FIG. 7), shearing failure will not occur.

The horizontal movement device 7 will be described. As illustrated in FIGS. 5B and 6A, a slide beam 70 is supported at the opposite ends thereof by the slide frames 60. A fixed beam 71 is supported at the opposite ends thereof by support frames 72 which are fixed to the main frames 30. The slide beam 70 and the fixed beam 71 extend in the direction Y.

Figure 8A:
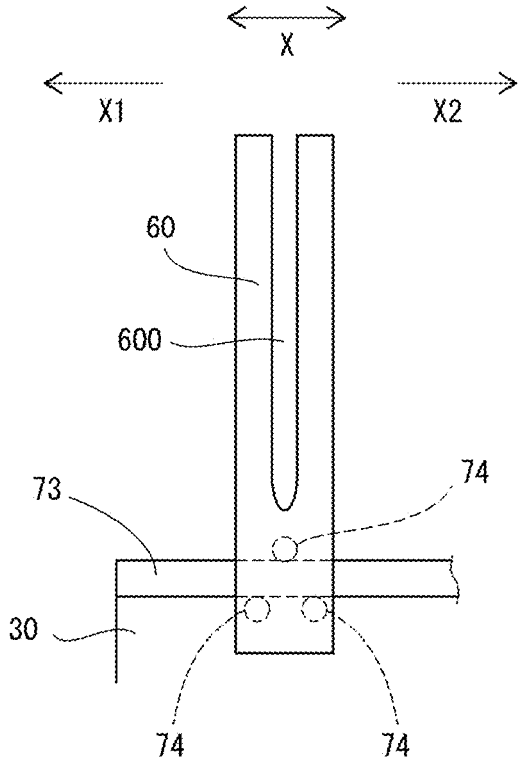
FIG. 8A is a schematic view of a guide arrangement.
Figure 8B:
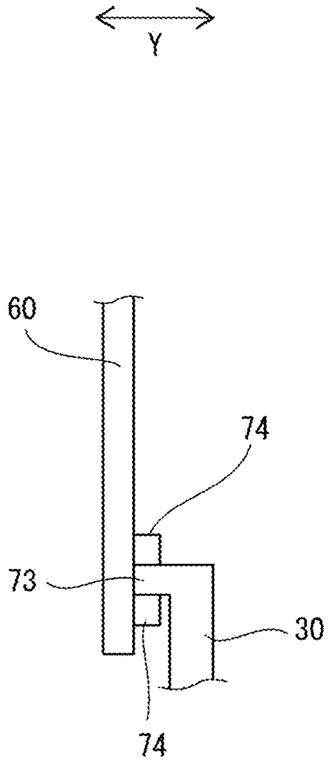
FIG. 8B is a schematic side view of FIG. 8A.

The slide frames 60 and the slide beam 70 are movable together in the direction X for a small range. For example, a rail structure may be employed for this purpose. As illustrated in FIG. 8A and FIG. 8B, a rail 73 is attached to each of the main frame 30 and extends in the direction X. Guide rollers 74 are rotatably supported by the slide frame 60 to sandwich the rail 73.

Figure 9:
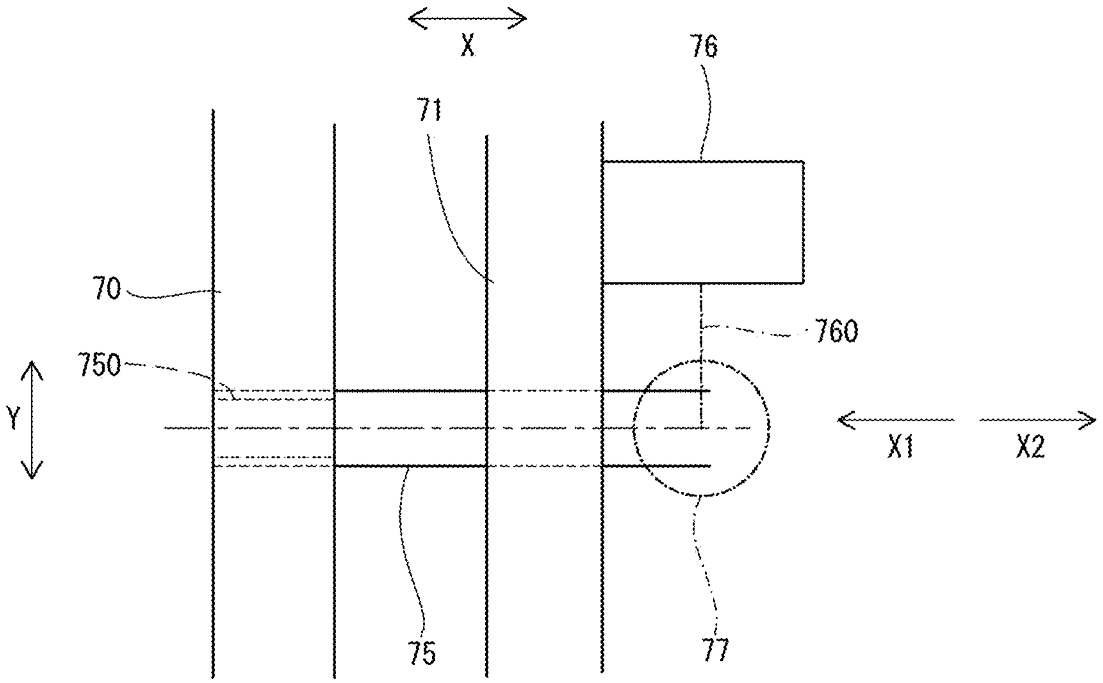
FIG. 9 is a schematic and enlarged view of an area T in FIG. 5B.

As illustrated in FIG. 5B, the slide beam 70 and the fixed beam 71 are connected to each other via a transmission shaft 75 extending in the direction X. As illustrated in FIG. 9, which illustrates the area T in FIG. 5B, the transmission shaft 75 is received by the fixed beam 71 to be rotatable and non-displaceable in the direction X. A portion of the transmission shaft 75 is configured as a feed screw 750. A female thread (not illustrated) is formed on the inner side of the slide beam 70 to be engaged with the feed screw 750.

The transmission shaft 75 is operatively connected to an actuator 76. For example, a motor located on the fixed beam 71 is used as the actuator 76. The transmission shaft 75 is connected at one end thereof to a bevel gear 77 which is mounted on the output shaft 760 of the motor 76. Thus, the transmission shaft 75 being rotated by the actuator 76 causes the slide frames 60 and the slide beam 70 to move in the direction X.

Although not illustrated, the lower blade 51 is directly or indirectly attached to the slide frames 60 and can move together with the slide frames 60 and the slide beam 70.

Thus, the transmission shaft 75 being rotated by the actuator 76 causes the cutter pair 5 (upper blade 50 and lower blade 51) to move in the direction X.

The above-described devices 6 and 7 are merely examples. Any structure may be employed as these devices 6 and 7. For example, a motor 76 as the actuator and a bevel gear 77 may be connected via a gear train instead of being directly connected. The transmission shaft 75 with the bevel gear 77 may be built into the fixed beam 71. The two transmission shafts 75 may be arranged to be spaced from each other in the direction Y to more ensure the horizontal movement of the cutter pair 5. For this case, the two transmission shafts 75 are operably connected to the actuator 76 via a transmission arrangement including a bevel gear, a gear train, etc., to rotate synchronously.

Figure 10:
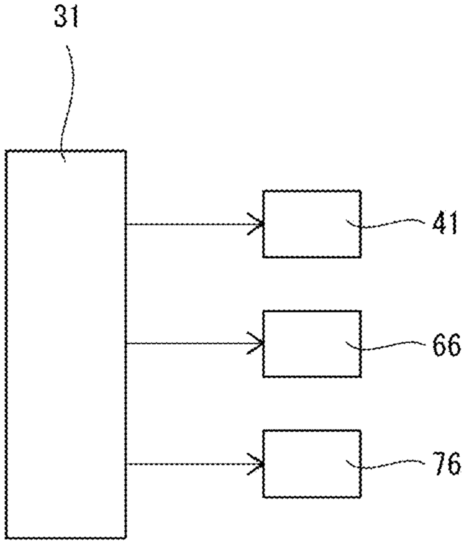
FIG. 10 is a block diagram of an example cross cut device.
Figure 12:
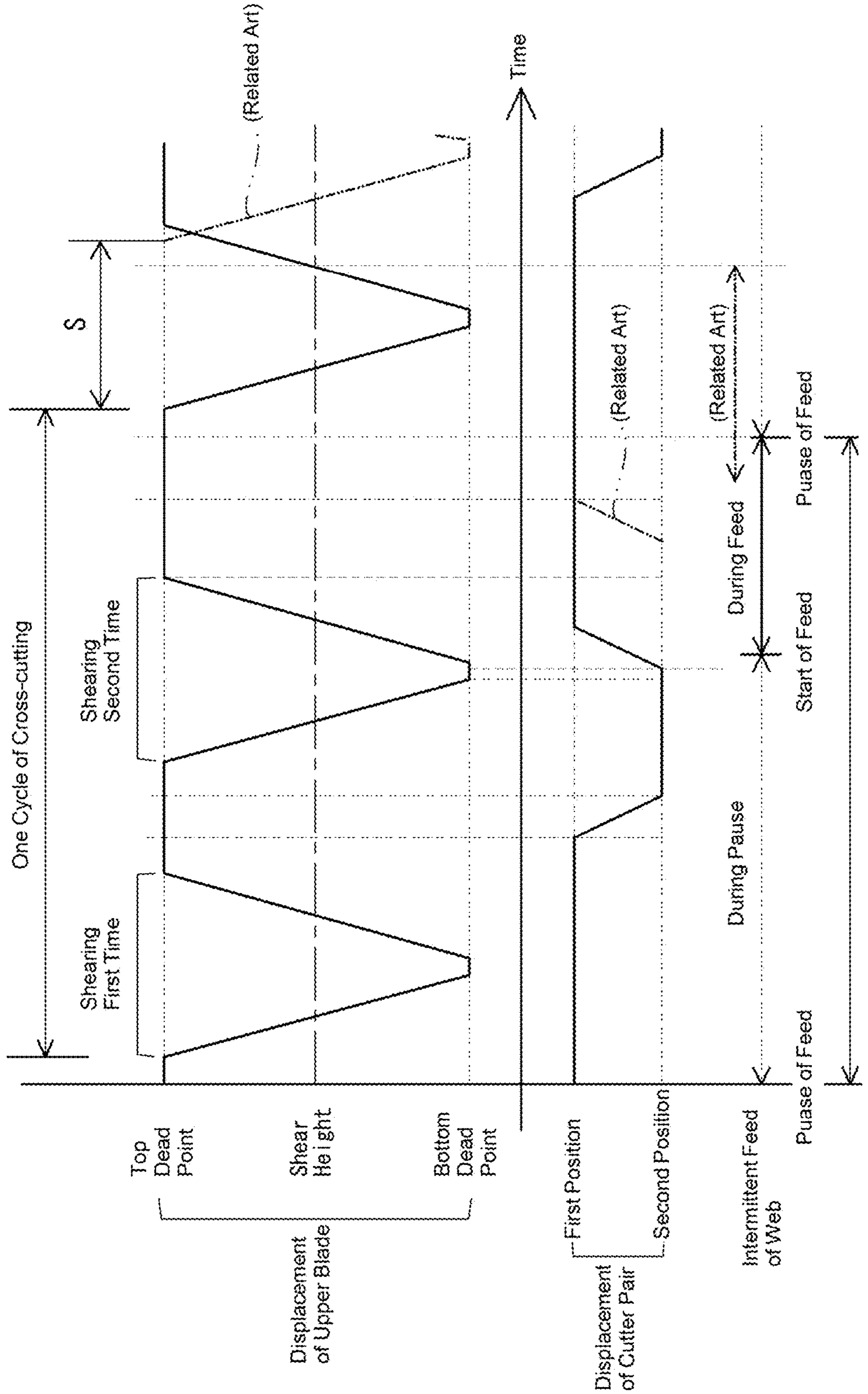
FIG. 12 illustrates an example timing chart for a cross cut device.

As illustrated in FIG. 10, the cross cut device 3 includes a control unit 31 (processor, controller, etc.) electrically connected to the actuators 41, 66 and 76. The control unit 31 controls the actuators 41, 66 and 76 (and thus the devices 4, 6 and 7) to perform the cross-cutting process. The cross-cutting process illustrated in FIG. 11 and FIG. 12 are described below.

First, the feed device 4 pauses feeding of the web(s) 1.

After a predetermined time from the start of pausing the feed, the cross cut device 3 shears the web 1 at the first position P1 (the first time). In other words, the vertical movement device 6 moves the upper blade 50 of the cutter pair 5 (which is at the first position P1) downward from the top dead point (uppermost position) to the bottom dead point (lowermost position), and then moves it from the bottom dead point back to the top dead point. The web 1 is sheared in the width direction Y of the web 1 by the upper blade 50 and the lower blade 51 at the first position P1 (see FIG. 11(1)(2)). The bags 10 are shaped by means of this first shearing and fed downstream by a conveyor (not illustrated).

The cross cut device 3 then shears the web 1 at the second position P2 (the second time). To begin with, the horizontal movement device 7 moves the cutter pair 5 (the upper blade 50 and the lower blade 51) upstream from the first position P1 to the second position P2 (FIG. 11 (3)). Then, the vertical movement device 6 moves the upper blade 50 downward from the top dead point to the bottom dead point at the second position P2 to shear the web 1 using the upper blade 50 and the lower blade 51 (FIG. 11(4)), and moves the upper blade 50 upward from the bottom dead point back to the top dead point.

A waste 18 is inevitably generated by means of the second shearing. The width of the waste 18 corresponds to the distance D between the first position P1 and the second position P2. As mentioned above, small wastes 180 are generated in the embodiment due to the corner-cutting and notching processes.

At or after the time when the upper blade 50 reaches the bottom dead point during the reciprocation of the upper blade 50 for the second shearing, the horizontal movement device 7 starts to move the cutter pair 5 downstream (in the direction X1) from the second position P2 back to the first position P1 (FIG. 11(4)(5)). Specifically, the horizontal movement device 7 starts to move the cutter pair 5 to the first position P1 after the upper blade 50 reaches the bottom dead point and before it exceeds the shear height h. More specifically, the horizontal movement device 7 starts to move the upper blade 50 from the second position P2 to the first position P1 while the upper blade 50 is staying at the bottom dead point, as illustrated in FIG. 12.

Figure 14A:
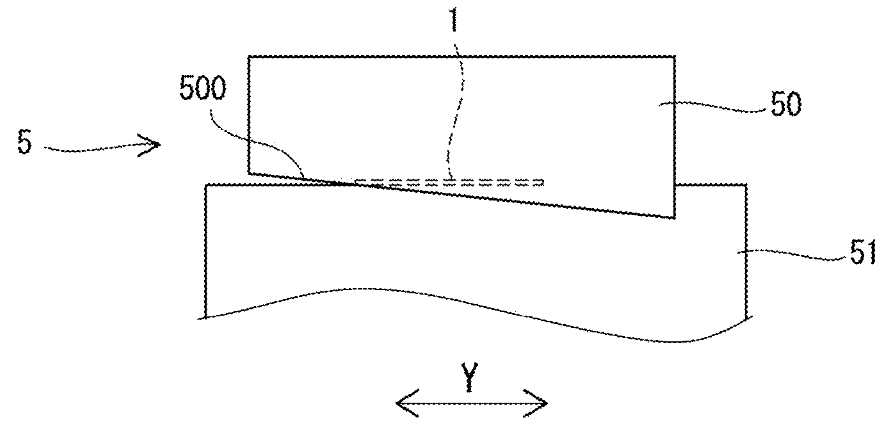
FIG. 14A illustrates a cutter pair with an upper blade at a shear height.

Here, "shear height h" is illustrated in FIG. 14A. The shear height h is the height at which the upper blade 50 finishes shearing the web 1, as illustrated in FIG. 14A. To put in another way, the shear height h of the upper blade 50 is the height at which the upper blade 50 has just blocked the feed path along which the web 1 passes.

The horizontal movement device 7 then finishes moving (returning) the cutter pair 5 to the first position P1 before or at the time when the upper blade 50 reaches the top dead point. Specifically, the horizontal movement device 7 in the embodiment finishes returning the cutter pair 5 to the first position P1 before the upper blade 50 exceeds the shear height h (FIG. 11(5) and FIG. 12).

The feed device 4 starts to feed the web 1 in the direction X1 using the feed rollers 40 subsequent to the cutter pair 5 starting to move to the first position P1. Specifically, the feed device 4 in the embodiment starts to feed the web 1 subsequent to the cutter pair 5 starting to move downstream and prior to the upper blade 50 exceeding the shear height h.

Figure 14B:
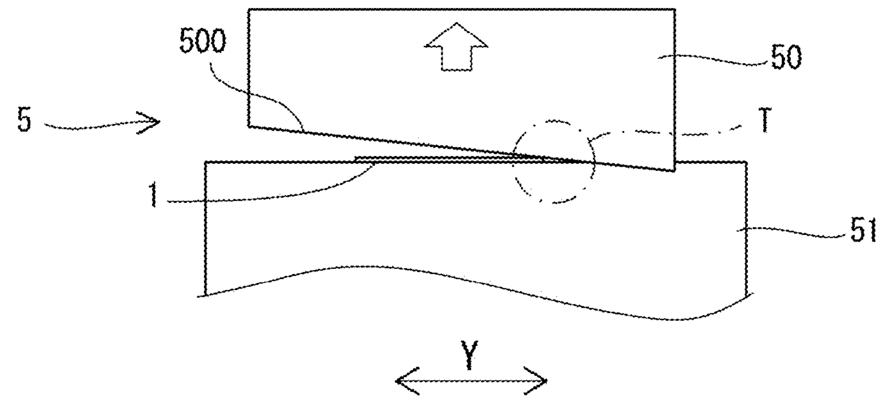
FIG. 14B illustrates an example timing of start of feeding a web 1.
Figure 14C:
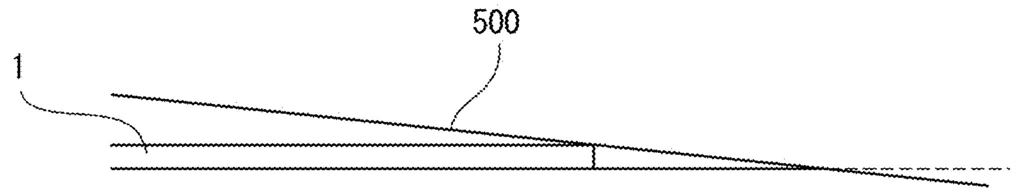
FIG. 14C is an enlarged view of an area T in FIG. 14B.

At the start of feeding the web 1, the upper blade 50 is blocking the feed path for the web 1, as illustrated in FIG. 11(5)(6). In this embodiment, the feed speed of the web 1 and its timing are controlled such that the tip of the web 1 does not exceed the position of the upstream surface of the upper blade 50 downstream at the time when the upper blade 50 completely releases the feed path for the web 1 by moving upward to the height illustrated in FIG. 14B. Thereby, a space through which the web 1 can pass is secured between the upper blade 50 and the lower blade 51 before the tip of the web 1 reaches the position of the upstream surface of the upper blade 50. This ensures that, even if the feed path is blocked by the upper blade 50 at the start of feeding the web 1, the feed device 4 can pass the web 1 pass through the space between the upper blade 50 and the lower blade 51 without collision with the upper blade 50. The height of the upper blade 50 indicated in FIG. 14B and FIG. 14C is hereinafter referred to as "feedable lower limit height".

The feed device 4 then finishes feeding the web 1 by the predetermined pitch and pauses the web 1 again. Thereafter, the above steps are repeated as one cycle of cross-cutting.

Figure 13:
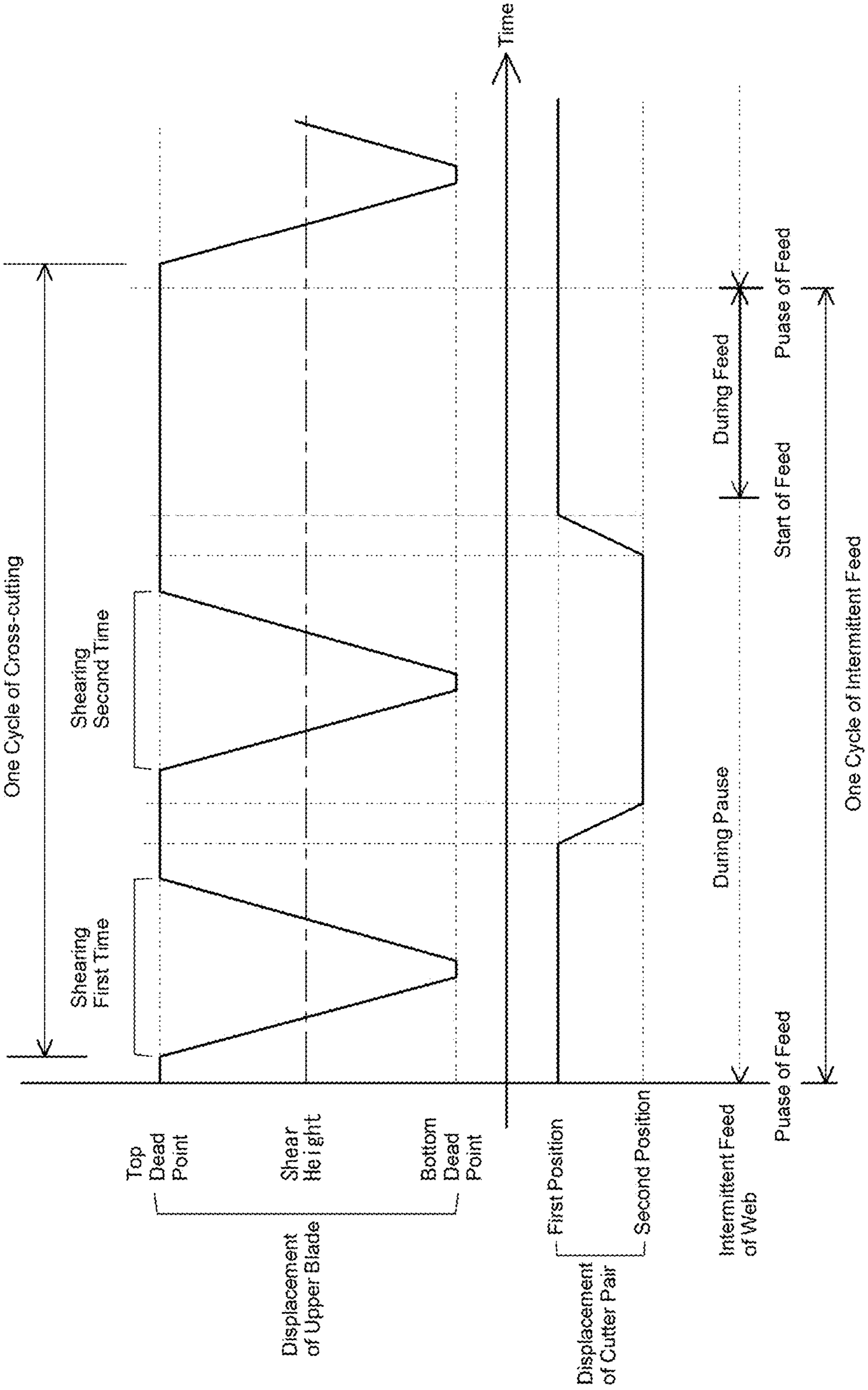
Related Art FIG. 13
FIG. 13 illustrates a timing chart according to a comparative example.

FIG. 13 illustrates a timing chart according to a comparative example. In the second reciprocation of the upper blade 50, the embodiment in FIG. 12 starts to move the cutter pair 5 downstream from the second position P2 during a period of time from the time at which the upper blade 50 reaches the bottom dead point to the time at which the upper blade 50 reaches the top dead point. In other words, this timing of the start of the downstream movement of the cutter pair 5 is earlier than that in the comparative example where the cutter pair starts to move from the second position after the upper blade reaches the top dead point. In the embodiment of FIG. 12, the return of the cutter pair 5 to the first position P1 is also completed by the time the upper blade 50 reaches the top dead point, which is, of course, earlier than that in the comparative example.

The embodiment in FIG. 12 starts to feed the web 1 during a period of time from the time at which the cutter pair 5 starts to move to the first position P1 to the time at which the upper blade 50 reaches the top dead point. This timing of the start of feeding the web 1 is earlier than that in the comparative example where the web 1 starts to be fed subsequent to the upper blade reaching the top dead point and the cutter pair reaching the first position.

Thereby, the embodiment shortens one cycle of cross-cutting by S (FIG. 12) compared to that in the comparative example and also shortens one cycle of intermittent feed. This leads to faster bag making.

Alternatively, the horizontal movement device 7 may start to move the cutter pair 5 from the second position P2 to the first position P1 immediately upon the upper blade 50 reaching the bottom dead point, and finish moving it back to the first position P1 at once. The feed device 4 may then start to feed the web 1.

Alternatively, the feed device 4 may start to feed the web 1 after the upper blade 50 exceeds the shear height h and before the upper blade 50 reaches the top dead point. As a more specific example, the feed device 4 may start to feed the web 1 after the upper blade 50 exceeds the feedable lower limit height in FIG. 14B and FIG. 14C. According to this example, the control of the timing and speed of feeding the web 1 is easier because a space through which the web 1 can pass is already secured between the upper blade 50 and the lower blade 51 at the start of feeding the web 1.

The embodiment has the following advantages regarding the removal of the waste 18, especially the small wastes 180, due to the above configuration.

Figure 15A:
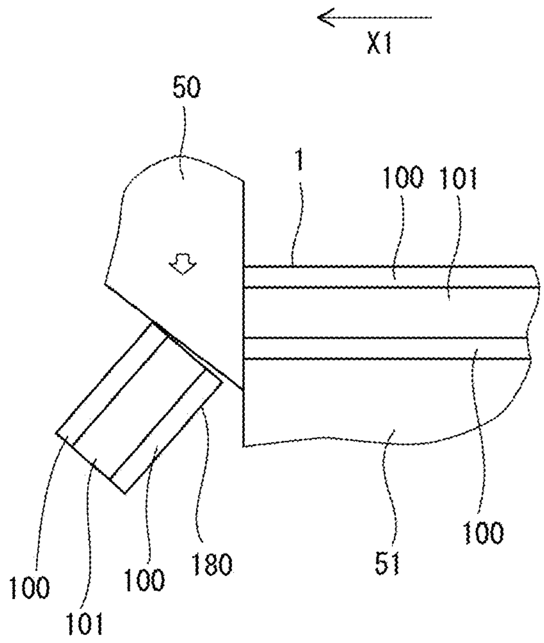
FIG. 15A to FIG. 15C illustrate an example cross-cutting process.
Figure 15B:
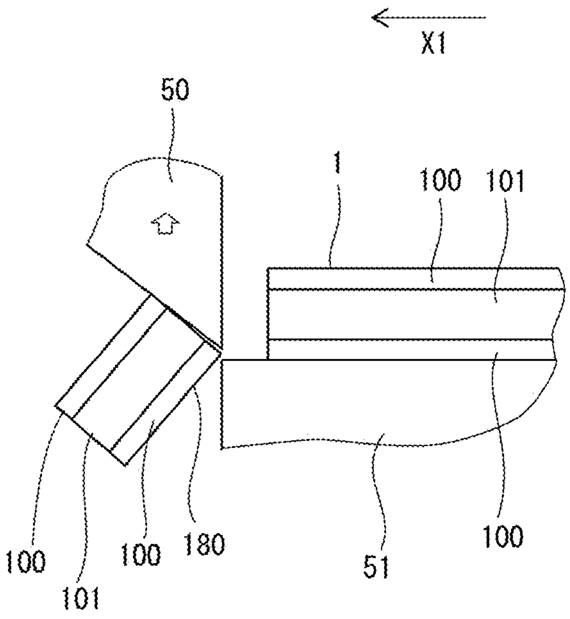
Figure 15C:
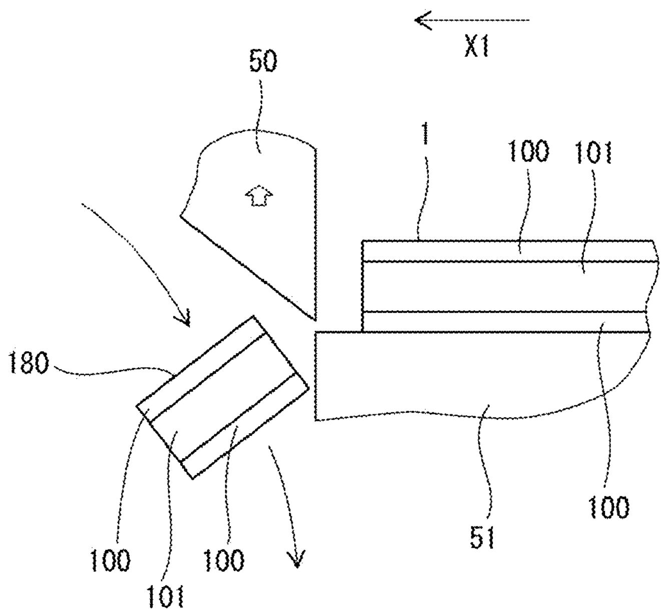

Referring to FIG. 15A and FIG. 15B, the microscopic behavior of the small waste(s) 180 in the embodiment is explained. The heat seal device 20 (FIG. 1) in the embodiment heat-seals two webs 1 or a web 1 folded in half to each other by using melting of the sealant layer(s). The cross cut device 3 then cross-cuts the web 1 at a position within the cross sealed section 12 (FIG. 2). Thus, as illustrated in FIG. 15A, the sealant layer 101 is interposed between the base layers 100 in the web(s) 1 and the small waste(s) 180.

When the upper blade 50 moves downward to shear the web 1 in cooperation with the lower blade 51, heat is generated. This shearing heat causes the sealant layer 101 inside each of the web 1 and the small waste 180 to semi-melt at their sheared surfaces. The small waste 180 can stick to the upper blade 50 via its sealant layer 101 which is in the semi-molten state. In that state, the upper blade 50 moves downward to the bottom dead point.

By the time the tip of the upper blade 50 is at the height of the web 1 subsequent to the upper blade 50 turning to upward movement, the horizontal movement device 7 has started to move the upper blade 50 and the lower blade 51 downstream, as described above (FIG. 15B). This causes the small waste 180 to be moved away from the tip of the web 1 in the direction X1, which prevents the small waste 180 and the web 1 from being fused via the sealant.

A suction device (not illustrated) is disposed under the upper blade 51. When the upper blade 50 returns to move upward, the suction device generates a downward airflow by suction to blow the small waste 180 away from the upper blade 50 using this airflow.

Figure 16A:
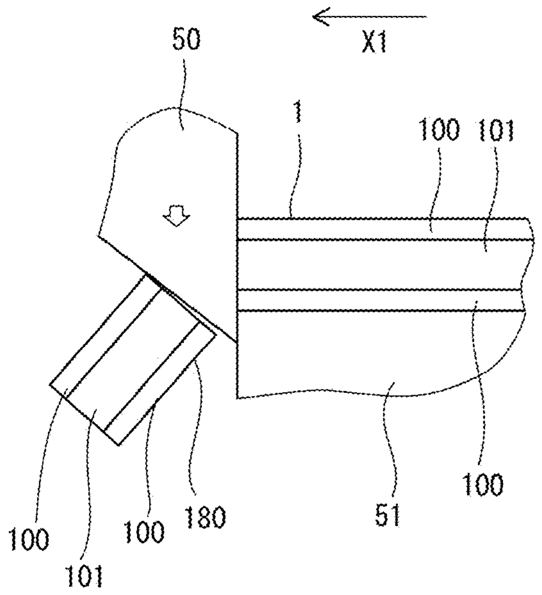
Related Art FIG. 16A
FIG. 16A to FIG. 16D illustrate a cross-cutting process according to a comparative example.
Figure 16B:
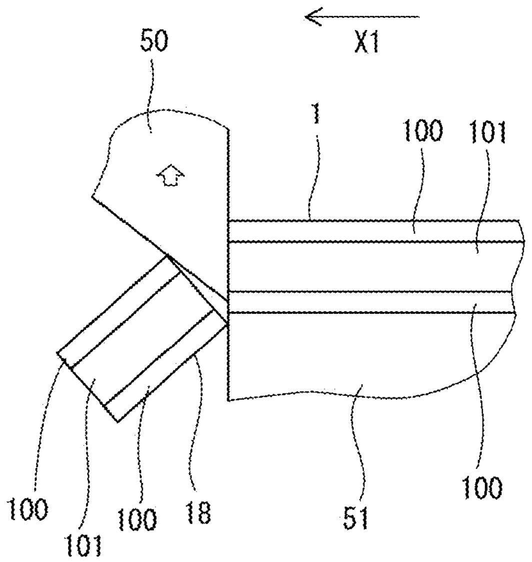
Related Art FIG. 16B
Figure 16C:
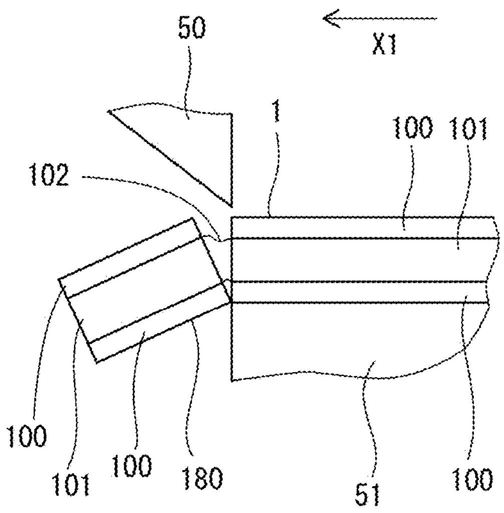
Related Art FIG. 16C
Figure 16D:
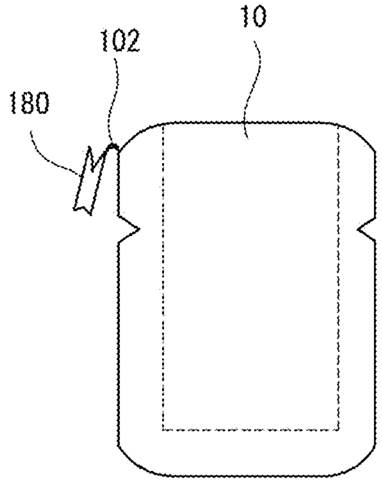
Related Art FIG. 16D

FIG. 16A to FIG. 16D illustrate a comparative example. In the comparative example where the upper blade 50 and the lower blade 51 are moved downstream after the upper blade 50 reaches the top dead point, the small waste 180 may get stick to the web 1 via the leaked semi-molten sealant 102 (FIG. 16C) when the upper blade 50 moves upward. As a result, the small waste 180 could be connected to the bag 10 via the string-like sealant 102, as illustrated in FIG. 16D.

As is clear from the comparison of the embodiment with the comparative example, the embodiment can prevent the small wastes 180 from sticking to the webs 1 and thus to the bags 10. Therefore, the embodiment can prevent the small wastes 180 from being mixed as foreign objects during the subsequent filling process.

Although described in connection with the small wastes 180, it would be easily appreciated by those skilled in the art that the cross cut device and method in the present application are also applicable to bag making apparatuses and bag making methods which do not involve notch-forming process and therefore produce not the small wastes 180 but a single elongated waste per cross-cutting.

A surface treatment for reducing friction, such as a Teflon (registered trademark) treatment, may be applied to the surface of the upper blade 50 to more ensure the separation of the small wastes 180 from the upper blade 50.

If the timing of the start of feeding the web(s) 1 is too early, the tip of the web 1 will touch the upstream surface of the upper blade 50. If the web 1 starts to be fed after the upper blade 50 has exceeded the feedable lower limit height, the small wastes 180 can be more reliably prevented from sticking to the web 1.

It is natural that the cross cut device 3 should be applicable to all types of bag making, not limited to the bag making illustrated in the examples above. For example, in addition to the web 1 (continuous sheet panel), accessory component(s) such as a gusset (side gusset, bottom gusset, etc.) and a zipper may be used. Instead of two-line bag making like the embodiment, the cross cut device 3 may be applied to single line bag making or multi-line bag making with three or more lines. The cross cut device 3 is particularly effective in bag making wherein cutting is performed twice at a narrow interval, in order to avoid short waste(s) from sticking to a bag body. Furthermore, the cross cut device 3 allows for advancing the timing of the start of the feed phase in the intermittent feed cycle for the web(s) 1, thereby increasing the bag making speed.

The invention claimed is:

1. A cross cut device for use in bag making and for shearing a web twice during a pause phase of an intermittent feed cycle, the cross cut device comprising:

a cutter pair including an upper blade and a lower blade for shearing the web;

a feed device for intermittently feeding a web in a longitudinal direction of the web;

a main frame;

a slide frame horizontally movable in the longitudinal direction along the main frame and having a guide groove vertically extending for guide of the upper blade, wherein the lower blade is supported by the slide frame;

a first actuator for vertically reciprocating the upper blade along the guide groove with respect to the lower blade to shear the web;

a second actuator for horizontally moving the slide frame to horizontally moving the upper blade guided by the guide groove and the lower blade supported by the slide frame together between a first position for first shearing and a second position for second shearing, the second position being spaced upstream of the first position; and a processor configured to control the feed device, the first actuator, and the second actuator, wherein the processor is configured to control the second actuator to, during the reciprocation of the upper blade for the second shearing, start to move the cutter pair from the second position to the first position subsequent to the upper blade reaching a lowermost height and prior to the upper blade exceeding a shear height, and wherein the processor is configured to control the feed device to start to feed the web subsequent to the cutter pair starting to move from the second position to the first position.

2. The cross cut device of claim 1, wherein the processor is configured to control the feed device to, during the reciprocation of the upper blade for the second shearing, start to feed the web prior to the upper blade exceeding the shear height and pass the web through a space between the upper blade and the lower blade subsequent to the upper blade exceeding the shear height.

3. The cross cut device of claim 1, wherein the processor is configured to control the feed device to, during the reciprocation of the upper blade for the second shearing, start to feed the web subsequent to the upper blade exceeding the shear height and prior to the upper blade reaching an uppermost height.

4. A bag making apparatus for successively making bags from at least one web, comprising the cross cut device of claim 1.

5. The bag making apparatus of claim 4, further comprising a punching machine disposed upstream of the cross cut device to punch the web during every intermittent feed cycle, the punching machine comprising:

a first punching blade for punching a hole or cutout for corner cut parts in the web; and a second punching blade for punching a hole for notches in the web at a position spaced in a width direction of the web away from the hole or cutout for the corner cut parts, wherein the cross cut device is configured to shear the web, using the cutter pair, in the width direction of the web across the hole or cutout for the corner cut parts and the hole for the notches to shape the bag having the notches and the corner cut parts.

6. The cross cut device of claim 1, further comprising:

a slide pin located on the upper blade and received in the guide groove to be vertically slidable along the guide groove;

a crankshaft rotatably supported by the main frame and operably connected to the first actuator;

a crank mounted on the crankshaft to be rotatable together with the crankshaft; and a connecting rod connected to the upper blade via the slide pin and connected to the crank via a crank pin.

7. The cross cut device of claim 6, further comprising: a spring for biasing the slide pin upstream.

8. The cross cut device of claim 1, further comprising:

a rail attached to the main frame to extend in the longitudinal direction; and guide rollers rotatably supported by the slide frame to sandwich the rail.

9. The cross cut device of claim 1, further comprising:

a fixed beam fixed with respect to the main frame;

a slide beam supported by the slide frame and having a female thread formed on an inner side surface thereof; and a transmission shaft extending in the longitudinal direction, operably connected to the second actuator, and received by the fixed beam to be rotatable and non-displaceable in the longitudinal direction, wherein the transmission shaft has a portion configured as a feed screw, and the feed screw is engaged with the female thread.

* * * * *